(12) United States Patent
Blankson

(10) Patent No.: US 11,912,094 B2
(45) Date of Patent: Feb. 27, 2024

(54) SUSPENSION ADJUSTMENT ASSEMBLY

(71) Applicant: R5 MSS LIMITED, Fareham (GB)

(72) Inventor: William Blankson, Fareham (GB)

(73) Assignee: R5 MSS Limited, Hampshire (GB)

( * ) Notice: Subject to any disclaimer, the term of this patent is extended or adjusted under 35 U.S.C. 154(b) by 464 days.

(21) Appl. No.: 17/296,801

(22) PCT Filed: Jul. 7, 2020

(86) PCT No.: PCT/GB2020/051628
§ 371 (c)(1),
(2) Date: May 25, 2021

(87) PCT Pub. No.: WO2021/005356
PCT Pub. Date: Jan. 14, 2021

(65) Prior Publication Data
US 2022/0001714 A1    Jan. 6, 2022

(30) Foreign Application Priority Data

Jul. 11, 2019 (GB) ..................... 1909944

(51) Int. Cl.
*B60G 17/02* (2006.01)
*B60G 15/06* (2006.01)

(52) U.S. Cl.
CPC .......... *B60G 17/021* (2013.01); *B60G 15/062* (2013.01); *B60G 2202/312* (2013.01);
(Continued)

(58) Field of Classification Search
CPC ............... B60G 17/021; B60G 15/062; B60G 2202/312; B60G 2204/124;
(Continued)

(56) References Cited

U.S. PATENT DOCUMENTS 6,827,184 B1 * 12/2004 Lin ................... B60G 11/15
267/221
9,140,325 B2 * 9/2015 Cox ................... F16F 9/56
(Continued)

FOREIGN PATENT DOCUMENTS

EP        2236324 A2   10/2010
GB        2529254      2/2016
(Continued)

OTHER PUBLICATIONS

International Search Report dated Nov. 2, 2020 for International Application No. PCT/GB2020/051628 from the European Patent Office.
(Continued)

*Primary Examiner* — Thomas W Irvin
(74) *Attorney, Agent, or Firm* — Keusey & Associates, P.C.

(57) ABSTRACT

A shock absorber adjuster assembly comprising at least one spring arranged so as, in use, to extend between a pair of spaced apart spring seats. At least one of the spring seats is adjustable and is formed by a cylindrical body, a first adjustable member and a second adjustable member. The body has a first thread formed on its outer surface and a second thread formed on its inner surface. The first adjustable member includes a first flange having a threaded inner surface which is engageable with the first thread of the body so that the first flange can be screwed along the first thread. The second adjustable member includes a second flange provided on an end of a shaft. The separation between the first and second flanges can thereby be adjusted by moving of either or both of said first and second flanges.

14 Claims, 7 Drawing Sheets

(52) U.S. Cl.
CPC ............ *B60G 2204/124* (2013.01); *B60G 2204/4604* (2013.01); *B60G 2204/61* (2013.01); *B60G 2206/93* (2013.01); *B60G 2500/20* (2013.01); *B60G 2600/20* (2013.01); *B60G 2800/162* (2013.01)

(58) Field of Classification Search
CPC ........ B60G 2204/4604; B60G 2204/61; B60G 2206/93; B60G 2500/20; B60G 2600/20; B60G 2800/162; F16F 9/56; F16F 9/0245; F16F 1/121
See application file for complete search history.

(56) References Cited

U.S. PATENT DOCUMENTS

| | | | | |
|---|---|---|---|---|
| 9,744,826 B2* | 8/2017 | Cox | ............... | B60G 15/063 |
| 9,869,360 B2* | 1/2018 | Smith | ............... | F16B 37/0892 |
| 10,953,717 B2* | 3/2021 | Ricketts | ............... | B60G 15/065 |
| 11,318,805 B2* | 5/2022 | Blankson | ............... | B60G 17/021 |
| 11,421,748 B2* | 8/2022 | Lee | ............... | B60G 11/36 |
| 2008/0099968 A1* | 5/2008 | Schroeder | ............... | F16F 3/04 |
| | | | | 267/179 |
| 2010/0252972 A1* | 10/2010 | Cox | ............... | F16F 1/121 |
| | | | | 267/286 |
| 2014/0353893 A1* | 12/2014 | Cox | ............... | B25B 13/48 |
| | | | | 267/286 |
| 2015/0308536 A1 | 10/2015 | Smith | | |
| 2016/0121686 A1* | 5/2016 | Botello | ............... | B60G 17/021 |
| | | | | 280/6.157 |
| 2020/0001677 A1* | 1/2020 | Blankson | ............... | B60G 11/14 |
| 2020/0361267 A1* | 11/2020 | Ricketts | ............... | B60G 15/063 |
| 2021/0300139 A1* | 9/2021 | D'Orazio | ............... | B60G 15/065 |

FOREIGN PATENT DOCUMENTS

| | | |
|---|---|---|
| JP | 1999037203 A | 2/1999 |
| JP | H1137203 A | 2/1999 |

OTHER PUBLICATIONS

YouTube video clip entitled "Eventuri Rs3 8V testing MSS Height Adjustable Springs", uploaded on Apr. 19, 2019 by user "Evolve Automotive". Retrieved from internet: <https://www.evolveautomotive.com/blog/eventuri-rs3-8v-testing-mss-height-adjustable-springs.html>.

Neil Birkitt, "Stacking it up!", Mss-Audidriver, Sep. 1, 2013, pp. 29-31, Retrieved from the internet: <https://www.scribd.com/document/206635641/Mss-Audidriver>.

* cited by examiner

SUSPENSION ADJUSTMENT ASSEMBLY

BACKGROUND OF THE INVENTION

1. Field of the Invention

The present invention relates to improvements in sprung shock absorbers and more particularly to adjustment mechanisms for enabling adjusting the spring loading of such sprung shock absorbers.

2. The Prior Art

Shock absorbers such as are used on car suspension systems are well known in the art. Typical such shock absorbers comprise at least one spiral spring which winds around a central fluid filled shock damper strut. More particularly, the strut is formed by a strut housing in which is longitudinally moveable a strut shaft so as to be extendable from and retractable into the strut housing. The strut housing is fluid filled and the end of the strut shaft acts like a piston in said housing so that its longitudinal movement is dampened. A pair of spaced apart spring seats are provided on the strut, one carried on the housing and one carried on the shaft, such that as the shaft moves into and out of the housing, the spring seats move towards and away from each other, causing the spring engaged between the two spring seats to be compressed or relaxed so as to control the shock absorbing capability of the shock absorber. This capability is, therefore, dependent on the spring constant of the spiral spring. In a simpler configuration, a spring may be used without a strut, the spring seats being fixed, respectively to the body of the vehicle and to part of the wheel mount such as a wishbone so that the spring extends therebetween.

In some applications, it is desirable to be able to adjust the pre-load of the spring, so as, for example, to enable the responsiveness of the shock absorber to be varied, to change the ride height of the vehicle or the like. To achieve that goal, applicant's own earlier UK patent application no. GB 1414558.5 discloses a shock absorber in which one of said spring seats is configured to be adjustable relative to the part of the shock absorber on which it is mounted by way of a threaded mounting. More particularly, the spring seat is formed by a tubular shaft having a second flange formed on one end thereof in fixed relation to the shaft, and a thread formed on the outer surface of the shaft extending from the other end on which is threadingly mounted a second, annular flange having a threaded inner surface. The second flange is longitudinally adjustable along the shaft by screwing the second flange up and down the thread. The second flange forms a spring seat for an end of a suspension spring, adjustment of the second flange along the shaft varying the separation between the first and second flanges so as to vary the preload on the spring.

Whilst this arrangement works adequately for smaller adjustments, in order to allow larger adjustments to be made, it would be necessary to make the shaft longer to allow for greater travel of the second flange along the shaft. However, this makes initial fitting of the adjuster more difficult and time consuming, makes the shaft weaker at the long end with the additional load which will be placed upon it by heavier vehicles, and also raises packaging issues.

SUMMARY OF THE INVENTION

According to a first aspect of the present invention, there is provided a shock absorber adjuster assembly comprising at least one spring arranged so as, in use, to extend between a pair of spaced apart spring seats, wherein at least one of the spring seats is adjustable and is formed by a cylindrical body having a first thread formed on its outer surface and a second thread formed on its inner surface, a first adjustable member comprised of a first flange having a threaded inner surface which is engageable with the first thread of the body so that the first flange can be screwed along the first thread so as to adjust the longitudinal position of the first flange on the body, and a second adjustable member comprised of a second flange provided on an end of a shaft, the shaft having a thread formed on its outside surface complementary to the second thread of the body such that the shaft of the second adjustable member is engageable with the second thread through an end of the body and can be screwed along the second thread so as to adjust the longitudinal space between the second flange and said end of the cylindrical shaft, whereby the separation between the first and second flanges can be adjusted by moving of either or both of said first and second flanges.

A shock absorber adjuster assembly in accordance with the invention has the advantage that, by providing the adjuster with two adjustable flanges—one via and internal thread and one via and external thread, the adjustment range for the adjuster is effectively doubled compared to prior art adjusters of a corresponding size. In practice, the first flange acts as a spring seat, engaging an end of a suspension spring with the end of body which is opposite to the end in which the shaft of the second adjustable member and which extends beyond the first flange extending inside the windings of the abutting spring end to locate the spring end on the adjuster.

According to another aspect of the present invention, there is provided an adjustable spring seat for a shock absorber, comprising a cylindrical body having a first thread formed on its outer surface and a second thread formed on its inner surface, a first adjustable member comprised of a first flange having a threaded inner surface which is engageable with the first thread of the body so that the first flange can be screwed along the first thread so as to adjust the longitudinal position of the first flange on the body, and a second adjustable member comprised of a second flange provided on an end of a shaft, the shaft having a thread formed on its outside surface complementary to the second thread of the body such that the shaft of the second adjustable member is engageable with the second thread through an end of the body and can be screwed along the second thread so as to adjust the longitudinal space between the second flange and said end of the cylindrical shaft, whereby the separation between the first and second flanges can be adjusted by moving of either or both of said first and second flanges. Preferably, the body includes engaging means by means of which a torsional force can be applied to the body either to rotate it to effect simultaneous adjustment of both the first and the second adjustable members, or in order to hold it against rotation during adjustment of the first and/or second adjustable members.

In particular, the body may include radial opens in its outer surface, preferably distributed at least partially around the circumference of the body into which are engageable teeth provided on a restraining tool so as to apply a torque to the body.

A set of radial openings may be provided at more than one position along the length of the body so as to enable the tool to engage a set of openings even if one set it obscured by the first adjustable member.

In a preferred embodiment, however, the radial openings are formed in a third flange which is provided on the outer surface of the body and is rotationally fast therewith, in particular is integrally formed with the body. In this configuration, the third flange also forms a stop for the travel of the first flange along the outer surface of the body towards the second flange.

The openings may advantageously form as circumferentially extending slots.

The engaging means may, however, take other forms such as flats, either directly on the other surface of the body or on a flange or the like rotationally fast therewith, which may be engaged by jaws of a spanner-type tool.

The first and second threads may advantageously be of opposite hand such that the first and second flanges may be simultaneously moved away from each other by rotating the body in a one direction, and moved towards each other by rotating the body in the other direction.

Stop means may be associated with each adjustable member to enable it to be locked in position against unintentional longitudinal movement. The stop means may take the form, for example, of a lock ring or nut which winds up behind each adjustable member, a locking collar, locking pins or the like.

The outer dimension of the body is preferably sized to be a close tolerance fit inside the spring with which the spring seat engages to minimize lateral movement of the spring on the seat.

Each of the main body and the second adjustable member are preferably tubular to allow a suspension strut to pass therethrough.

BRIEF DESCRIPTION OF THE DRAWINGS

In order that the invention may be well understood, there will now be described an embodiment thereof, given by way of example, reference being made to the accompanying drawings, in which.

DETAILED DESCRIPTION OF THE PREFERRED EMBODIMENT

Figure 1:
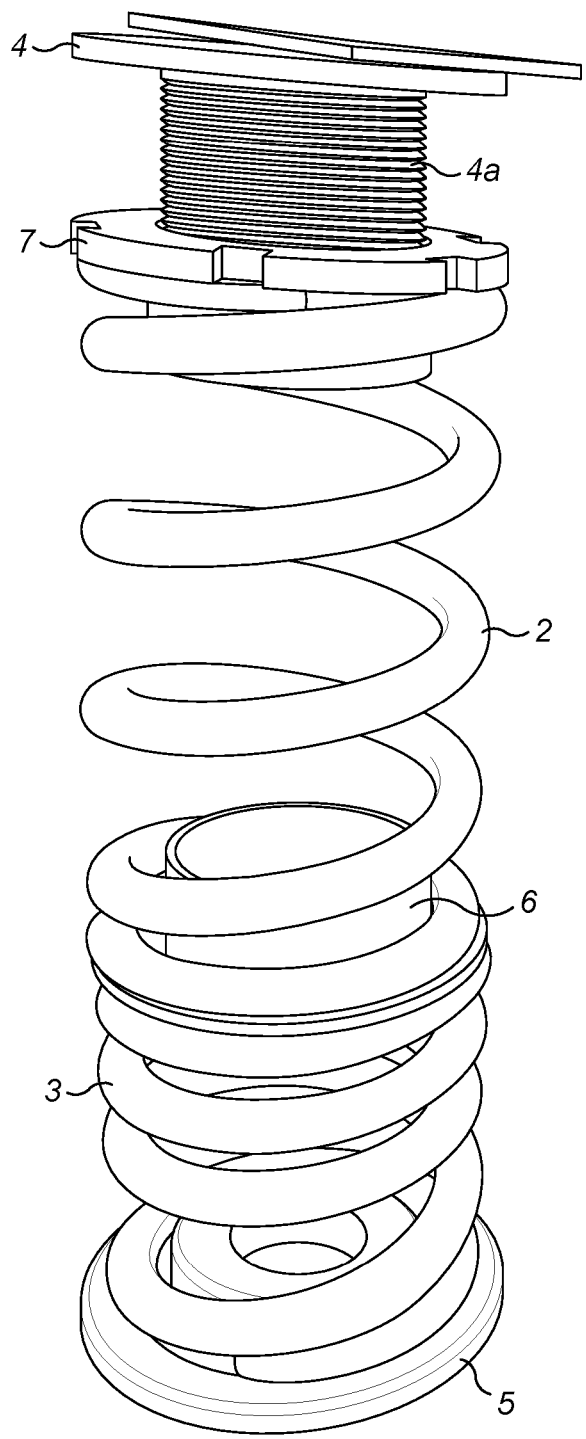
FIG. 1 is an adjustable spring seat according to the prior art.

Referring first to FIG. 1, there is shown an example of applicant's own earlier prior art arrangement. A pair of springs 2, 3 are arrange in series between a pair of spring seats 4, 5, the upper spring seat 4 of which is adjustable.

The upper spring seat 4 is formed by an upper flange 6 having a shaft 4b extending therefrom into the windings of the abutting end 2a of the spring 2 so as to retain it in position. The upper flange, in use, engages against a part of the vehicle suspension to transmit the force from the suspension strut and spring to the vehicle. The outer surface 4a of the shaft 4b of the upper spring seat 4 is threaded and has a flange member 7 against which the upper end 2a of the spring 2 engages. The flange member 7 is threadably mounted on the outer surface 4a of the shaft so as to be longitudinally moveable along the shaft 4b by winding along the thread. In this way, the compression of the spring can be adjusted.

Figure 2:
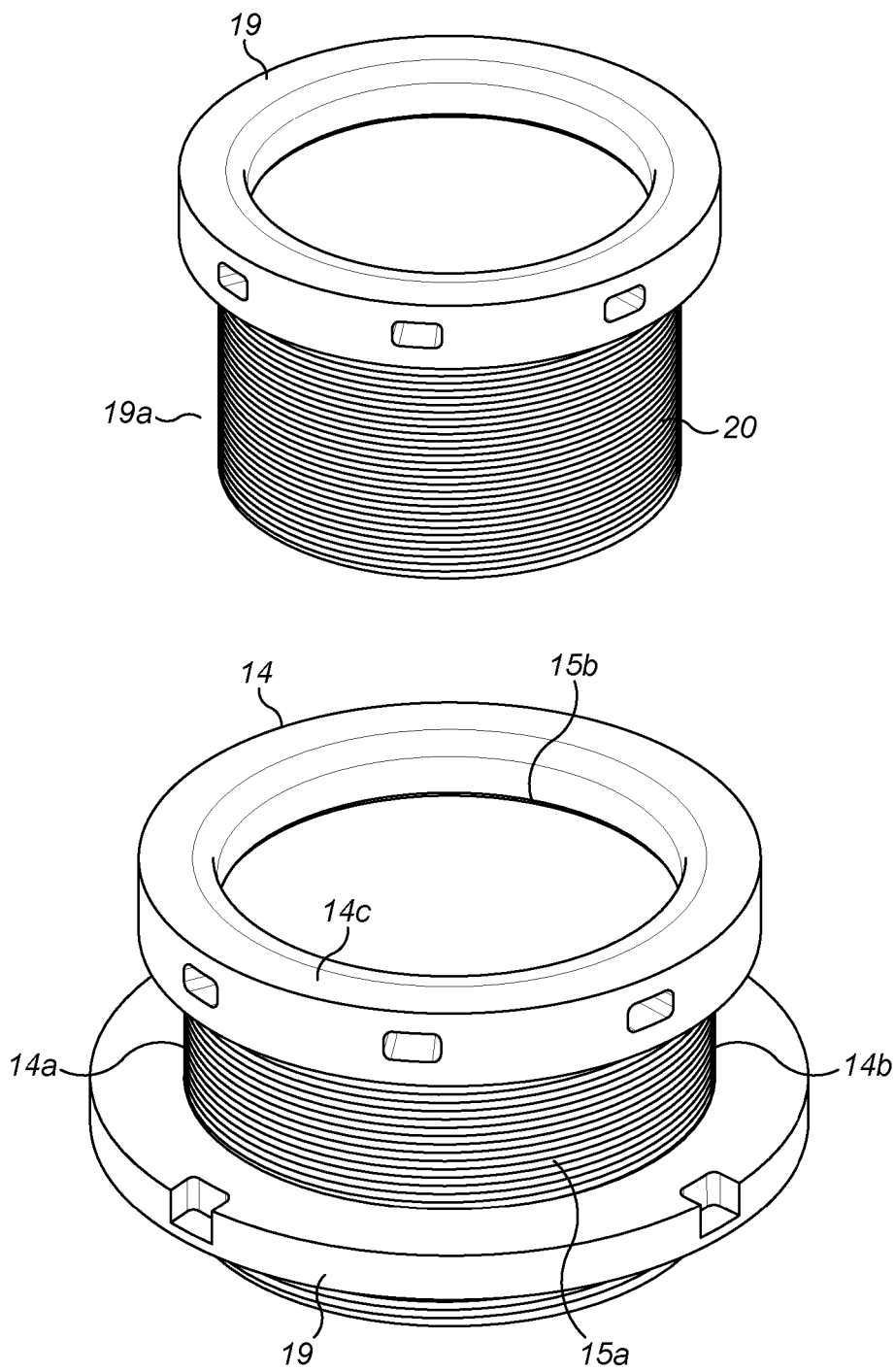
FIG. 2 is an adjustable spring seat according to an embodiment of the invention.
Figure 3A:
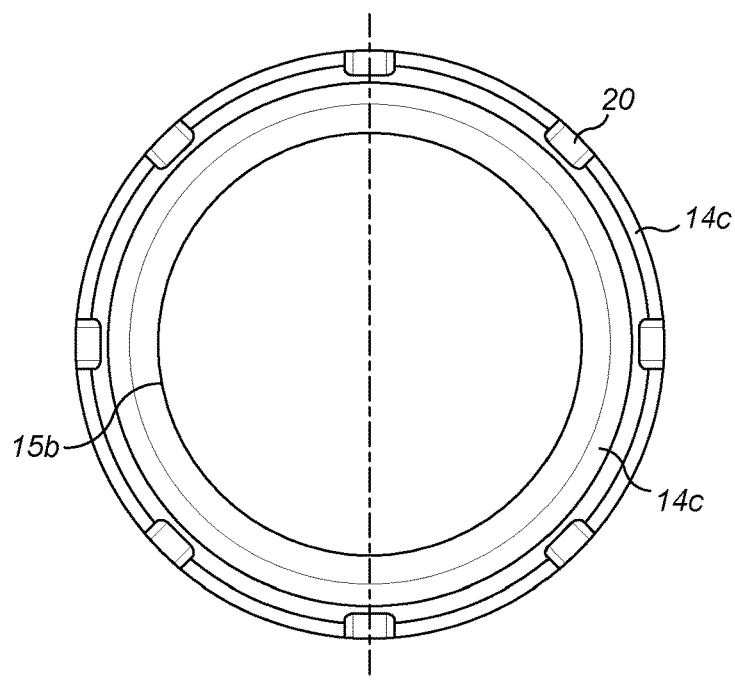
FIGS. 3a to 3c are various views of the main body of the adjustable spring seat of FIG. 2.
Figure 3B:
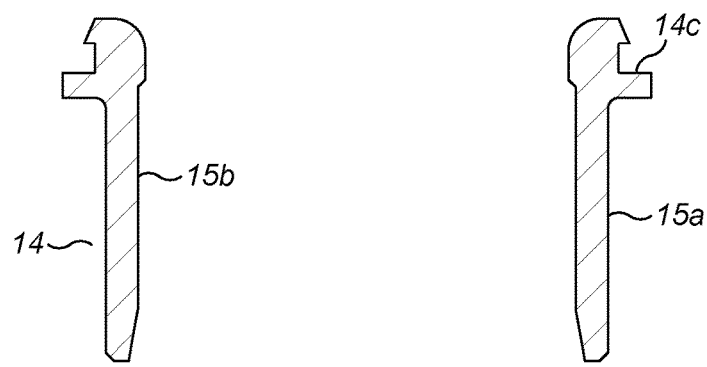
Figure 3C:
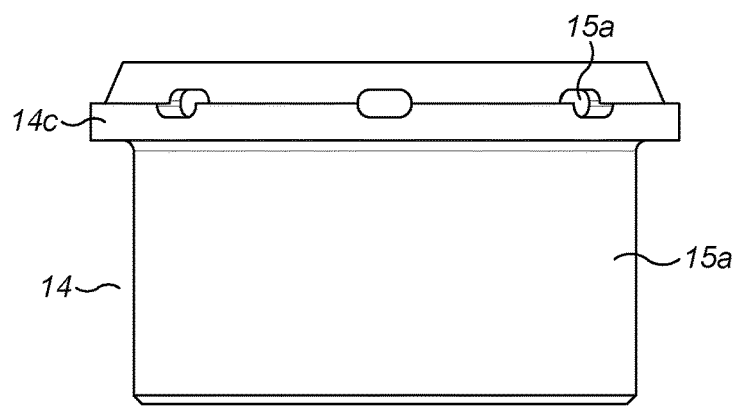

Referring now to FIG. 2, there is shown an adjustable suspension spring seat according to the present invention. As with the prior art arrangement of FIG. 1, the spring seat is formed a main body 14 having a shaft 14b which, in use, extends into the windings of the abutting end of the spring so as to retain the spring in position on the shaft. The shaft 14b of the main body 14 has a radial flange 14c formed on one end thereof and outer surface 14a of the shaft 14b, extending away from the radial flange, has a male thread 15a provided thereon on which is carried a first adjustable member in the form of an adjustable flange member 17.

Figure 4A:
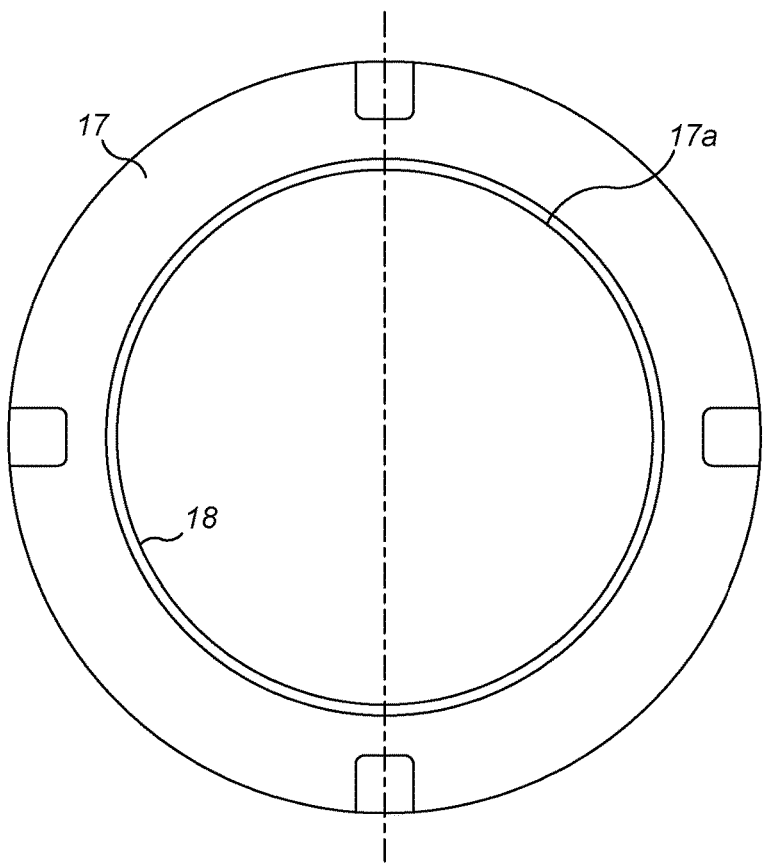
FIGS. 4a to 4c are various views of the first adjustable member of the adjustable spring seat of FIG. 2.
Figure 4B:
Figure 4C:
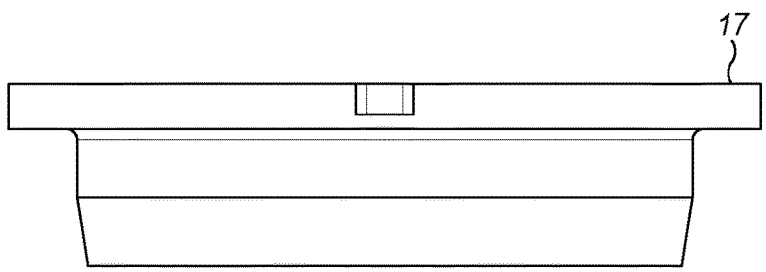

More particularly, as shown in FIGS. 4a-4c, the adjustable flange member 17 is annular shaped and has a female thread 18 provided on its inner cylindrical surface 17a which is complementary to the thread 15a formed on the outer surface 14a of the shaft The flange member 17 is thereby threadably mounted on the outer surface 14a of the shaft 14b so as to be longitudinally moveable along the shaft 14b between a fully retracted position in which it engages against the radial flange 14c of the main body 14 and a fully extended position in which it is wound to the bottom of the thread 15a as shown in FIG. 2. This accordingly provides a first range of adjustment for the compression of a spring against in which the shaft 14b is engaged in a similar manner to the prior art arrangement described above.

The main body 14 furthermore has a female thread 15b formed on its inner cylindrical surface extending from the end on which the radial flange 14c is carried.

Figure 5A:
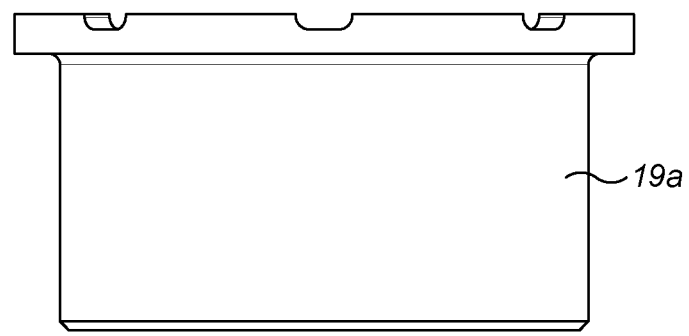
FIGS. 5a and 5b are various views of the second adjustable member of the adjustable spring seat of FIG. 2.
Figure 5B:

A second adjustable member 19, shown in FIGS. 5a and 5b, comprises a flange 19b with a shaft 19a extending therefrom having a male thread 19c formed on its outer cylindrical surface which is complementary to the female thread 15b formed on the inner cylindrical surface of the main body 14 such that the shaft 19a of the second adjustable member 19 is screwingly engageable into the main body 14 in order to secure it thereto, the separation between the flange 19b of the second adjustable member 19 and the radial flange 14c of the main body 14 being adjustable by screwing the second adjustable member 19 into and out of the main body 14.

Figure 6:
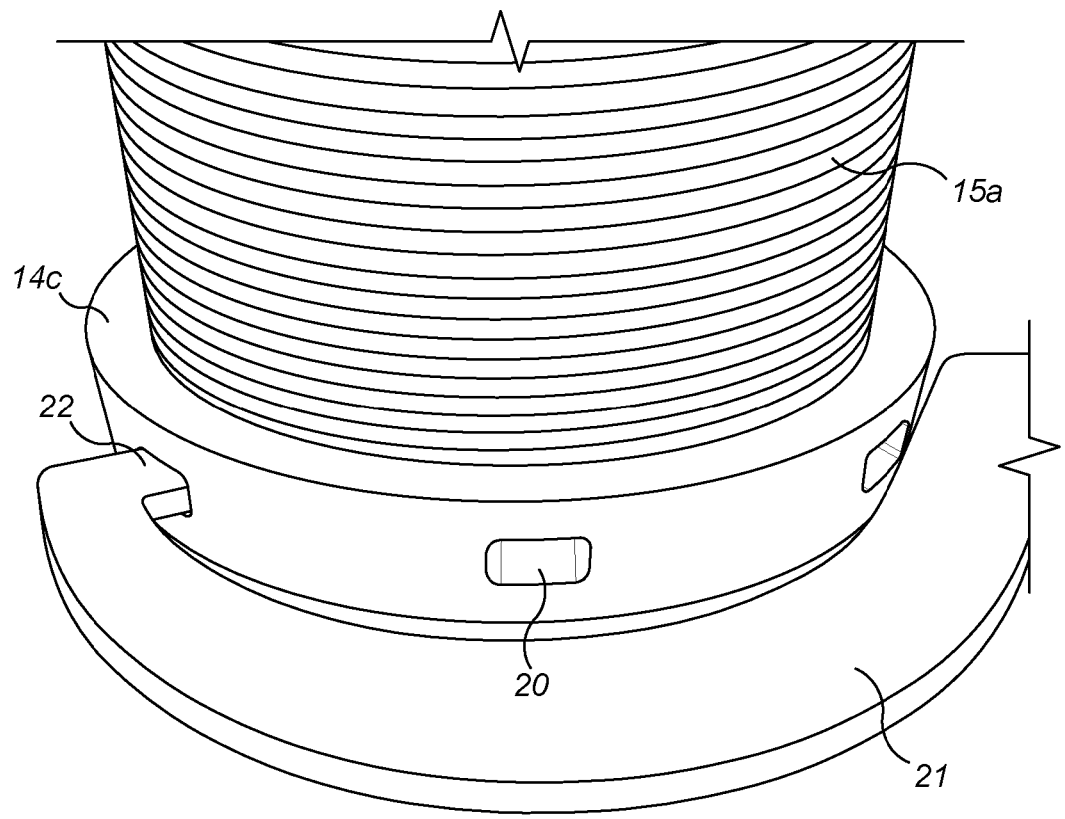
FIG. 6 is a side view of an adjusting tool engaging with the adjustable spring seat of FIG. 2.
Figure 7:
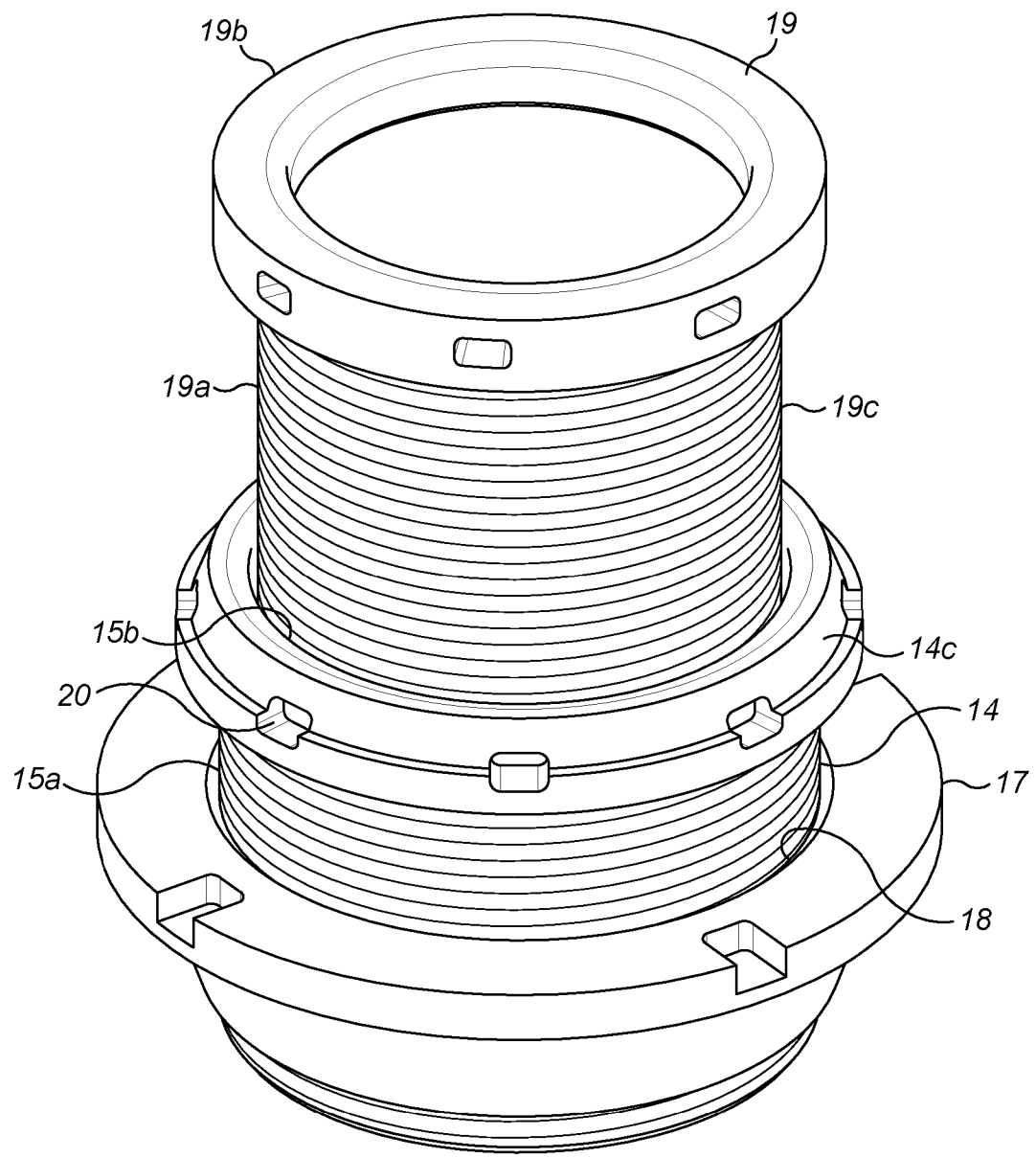
FIG. 7 is the assemble adjustable spring seat according to the invention.

The main body 14 includes circumferentially extending slots 20 in the outer circumferential face of the radial flange 14c, as shown in FIGS. 2 and 6, the slots 20 being distributed around the circumference of the flange 14c. An adjusting tool 21 includes teeth 22 thereon which are engageable in the slots 20 in order to enable a torsional load to be applied through the tool 21 to the main body 14.

The adjustable spring seat is assembled with the first adjustable member 17 wound fully onto the thread 15a on the outer surface 14a of the main body 14 so as to abut against on side of the radial flange 14c of the main body, and the second adjustable member 19 wound fully into the female thread 15b formed on the inner surface of the main body 14. The face of the flange 19b of the second adjustable member 19 is engaged against a suspension mounting point in a manner known in the art and an end of a suspension spring is engaged over the protruding end of the threaded shaft 14b of the main body 14.

In the preferred embodiment, the male thread 15a is of opposite hand to the female thread 15b, and the length of the male thread is substantially equal to the length of the female thread so that the adjustment range of each is the same. In order, then, to adjust the preload on the spring, the teeth 22 of the adjustment tool 21 are engaged in slots 20 in the radial flange 14c and the main body 14 is rotated, the load on the first and second adjustable members from the suspension engagement point and the spring preventing rotation so that the two adjustment members 17, 19 are extended away from each other, compressing the spring. The body 14 may be rotated in the opposite direction in order to retract the adjustable members towards each other and thereby reduce the load on the spring.

Alternatively, the tool 21 may be used to restrain the main body 14 from rotation whilst one or both of the adjustable members 17, 19 are rotated in order to adjust the load on the spring.

Although the invention has been described with the two threads 51a, 15b of the main body being of opposite hand, they may instead be of the same hand with adjustment only being made by rotating the adjustable members 17, 19.

What is claimed is:

1. An adjustable spring seat for a shock absorber comprising:
    a cylindrical body having an end and a first thread formed on its outer surface and a second thread formed on its inner surface;
    a first adjustable member including a first flange having a threaded inner surface which is engageable with the first thread of the cylindrical body so that the first flange can be screwed along the first thread so as to adjust a longitudinal position of the first flange on the cylindrical body; and
    a second adjustable member including a shaft having an end and a second flange disposed on the end of the shaft, the shaft further having an outside surface and a thread formed on said outside surface complementary to the second thread of the cylindrical body, wherein the shaft is engageable with the second thread through the end of the cylindrical body and can be screwed along the second thread so as to adjust a longitudinal space between the second flange and the end of the cylindrical body,
    wherein said first and second flanges being moveable independently of each other, whereby the separation between the first and second flanges can be adjusted by moving of either or both of said first and second flanges.

2. The adjustable spring seat according to claim 1, wherein the cylindrical body includes engaging means for applying a torsional force to the cylindrical body either to rotate it to effect simultaneous adjustment of both the first and the second adjustable members, or in order to hold it against rotation during adjustment of either or both of said first and second adjustable members.

3. The adjustable spring seat of claim 2, wherein the cylindrical body includes radial openings in its outer surface adapted to receive engageable teeth of a restraining tool so as to apply a torque to the cylindrical body.

4. The adjustable spring seat of claim 3, wherein the radial openings are distributed at least partially around a circumference of the cylindrical body.

5. The adjustable spring seat of claim 3, wherein a set of radial openings are provided at more than one position along a length of the cylindrical body so as to enable the tool to engage a set of radial openings even if one set is obscured by the first adjustable member.

6. The adjustable spring seat of claim 3, further comprising a third flange disposed on the outer surface of the cylindrical body, wherein the radial openings are formed in the third flange.

7. The adjustable spring seat of claim 6, wherein the third flange is rotationally fast with the cylindrical body.

8. The adjustable spring seat of claim 7, wherein the third flange is integrally formed with the cylindrical body.

9. The adjustable spring seat of claim 3, wherein the radial openings are formed as circumferentially extending slots.

10. The adjustable spring seat of claim 1, wherein the first and second threads are of opposite hand such that the first and second flanges may be simultaneously moved away from each other by rotating the cylindrical body in a one direction, and moved towards each other by rotating the cylindrical body in the other direction.

11. The adjustable spring seat of claim 1, further including stop means associated with each adjustable member to enable it to be locked in position against unintentional longitudinal movement.

12. The adjustable spring seat of claim 1, wherein the outer dimension of the cylindrical body is adapted to be a close tolerance fit inside the spring with which the spring seat engages to minimize lateral movement of the spring on the seat.

13. A shock absorber adjuster assembly comprising:
    at least one spring partially compressed between a pair of spaced apart spring seats,
    wherein at least one of the spring seats comprises the adjustable spring seat of claim 1.

14. The shock absorber adjuster assembly according to claim 13, wherein said adjustable spring seat engages with an end of the spring which is located upper most in the shock absorber assembly.

* * * * *